(12) United States Patent
Tanigaki et al.

(10) Patent No.: US 6,302,488 B1
(45) Date of Patent: Oct. 16, 2001

(54) STRADDLE TYPE VEHICLE SEAT

(75) Inventors: Satoshi Tanigaki; Ichiro Kurawaki, both of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 592 days.

(21) Appl. No.: 08/542,085

(22) Filed: Oct. 12, 1995

(30) Foreign Application Priority Data

Oct. 13, 1994 (JP) ........................................ 6-274417

(51) Int. Cl.[7] ...................................................... A47C 7/02
(52) U.S. Cl. ................ 297/452.61; 297/452.27; 297/214; 297/195.1
(58) Field of Search ................ 297/195.1, 195.12, 297/214, 452.27, 452.56, 452.57, 452.58, 452.61

(56) References Cited

U.S. PATENT DOCUMENTS

| | | | |
|---|---|---|---|
| 3,612,607 | * 10/1971 | Lohr | 297/452.27 |
| 3,778,104 | * 12/1973 | Kusters | 297/452.27 X |
| 4,699,427 | * 10/1987 | Kobayashi | 297/452.27 X |
| 5,108,076 | * 4/1992 | Chiarella | 297/452.27 X |
| 5,165,752 | * 11/1992 | Terry | 297/214 |

FOREIGN PATENT DOCUMENTS

| | | | |
|---|---|---|---|
| 540235 | * 4/1930 | (DE) | 297/195.1 |
| 2361650 | 5/1978 | (FR) . | |
| 6527 | * of 1895 | (GB) | 297/214 |
| 880554 | * 10/1961 | (GB) | 297/452.27 |
| 1222711 | * 2/1971 | (GB) | 297/452.27 |

OTHER PUBLICATIONS

Patent Abstracts of Japan, vol. 7 No. 215 (M–244), Sep. 22, 1983 & JP–A–58 110225 (Kasai Kogyo KK) Jun. 30, 1983 European Search Report.

* cited by examiner

Primary Examiner—Laurie K. Cranmer
(74) Attorney, Agent, or Firm—Knobbe, Martens, Olson & Bear LLP

(57) ABSTRACT

A variable firmness motorcycle seat that includes a bottom plate, a cushion stuffing placed on the bottom plate and a seat skin that covers the cushion stuffing and is secured to the bottom plate. In order to improve sitting comfort, a portion with a greater firmness than surrounding portions is incorporated into the seat so as to provide riding comfort and prevent permanent seat deformation problems. The location of the greater firmness portion corresponds to the area where seat pressure produced by a rider is greatest.

23 Claims, 5 Drawing Sheets

STRADDLE TYPE VEHICLE SEAT

BACKGROUND OF THE INVENTION

This invention relates to vehicle seats that have varied levels of firmness, especially vehicle seats with a saddle-type construction.

Vehicle seats with a saddle-type construction are commonly found on vehicles that require a rider to sit astride for balancing purposes, such as motorcycles, snowmobiles, and water jet propulsion units. Saddle-type vehicle seats typically have a construction that includes a hard bottom plate made of metal or hard plastic, a stuffing cushion made of expanded urethane, and a seat skin made of synthetic leather. The firmness or rigidity of the seat when a rider sits on it is altered by changing the thickness of the seat skin or by changing the material or density of the cushion stuffing.

The inherent design of a straddle-type seat makes the seat conducive to permanent deformation caused by repeated sitting in a commonly-used seat position. Over time, the commonly-used seat portion recedes and takes a permanent set. This permanent deformation of the seat causes riding discomfort and may cause the rider's line of vision to be at an unsafe altitude for operating the vehicle.

In the past, receding and deformation of the seat was corrected by increasing the entire seat firmness. The entire seat firmness could be increased by using a thicker seat skin stretched over the entire seat surface or changing the material or density of the cushion stuffing. Increasing the entire seat firmness improved comfort in a rider's less sensitive buttocks region but impaired comfort in the sensitive thigh and coccyx region, small bone at end of spine. Additionally, stretching the uniformly thick seat skin over the entire seat surface tended to produce wrinkles and affect the seat appearance.

The object of the present invention is to provide a saddle-type seat with a greater firmness portion that eliminates the disadvantages of permanent deformation found in conventional seats.

Another object of the present invention is to improve sitting comfort by providing greater firmness in the buttocks region of a rider and less firmness in the thigh and coccyx region of a rider.

A further object is to provide a seat skin that can be stretched over the entire seat surface and maintain a nice appearance without wrinkles.

Further objects and advantages of the present invention will become apparent from a consideration of the drawings and ensuing description.

SUMMARY OF THE INVENTION

A variable firmness vehicle seat that includes a bottom plate, a cushion stuffing placed on the bottom plate and a seat skin that covers the cushion stuffing and is secured to the bottom plate. In order to improve sitting comfort, a portion with a greater firmness than surrounding portions is incorporated into the seat so as to provide riding comfort and prevent permanent seat deformation problems. The location of the greater firmness portion corresponds to the area where seat pressure produced by a rider is greatest.

DETAILED DESCRIPTION OF THE PREFERRED EMBODIMENT

Figure 1:
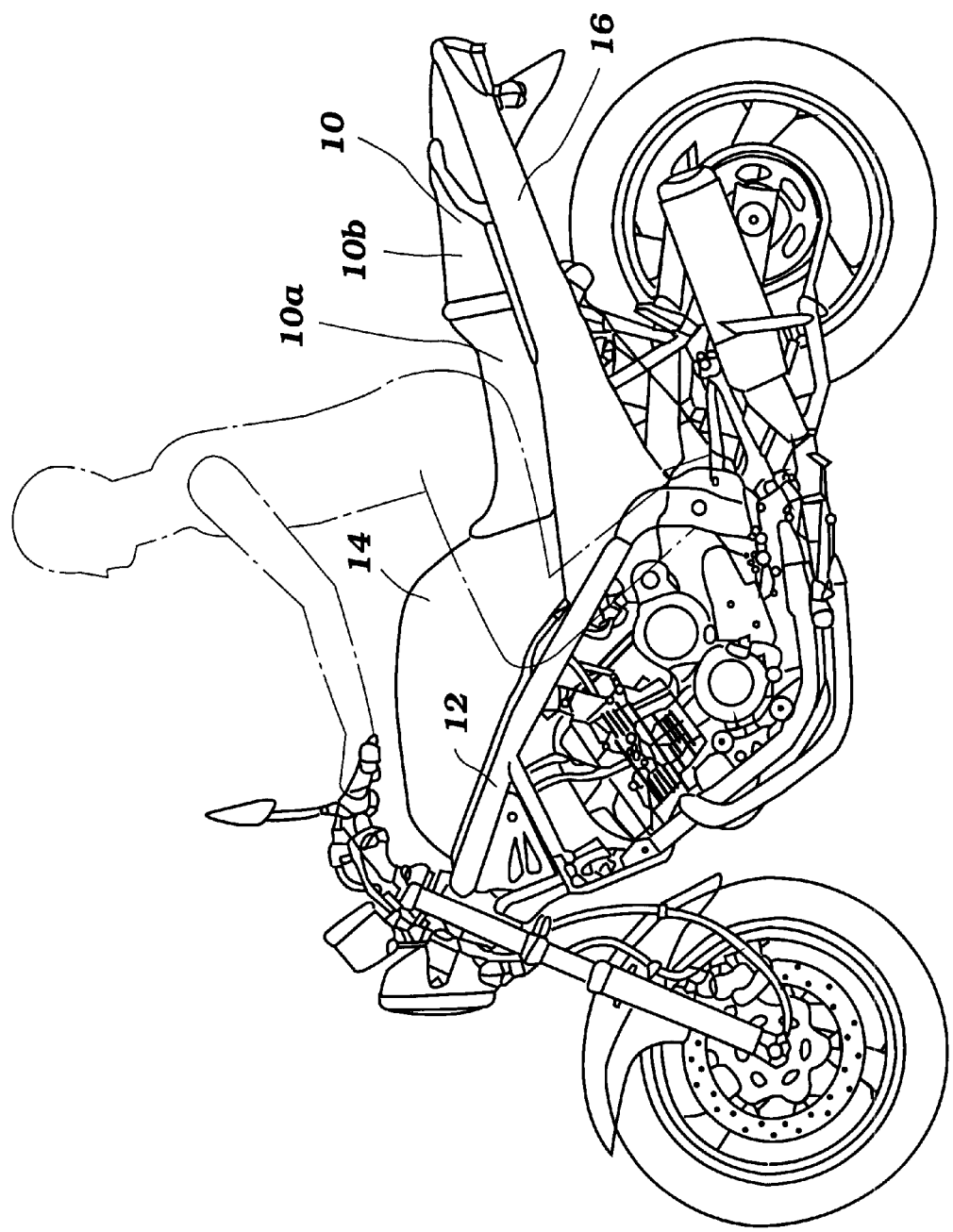
FIG. 1 is a schematic side view of a motorcycle that includes the seat of the present invention.

FIG. 1 is a schematic side view of the vehicle seat according to the present invention on a motorcycle. The present invention may be used with a motorcycle, but its application is not limited thereto. A vehicle seat 10 is a saddle type comprising a front seat portion 10a for a rider and a rear seat portion 10b for a co-rider. Seat 10 is continuous and forms a stepped shape between front seat portion 10a and rear seat portion 10b. The seat 10 is located behind a fuel tank 12 above a main frame 14 and is secured on a pair of seat frames (not shown) extending from a rear middle point on the main frame 14. Both sides of the seat frame below the seat; are covered with seat cowls 16.

Figure 2:
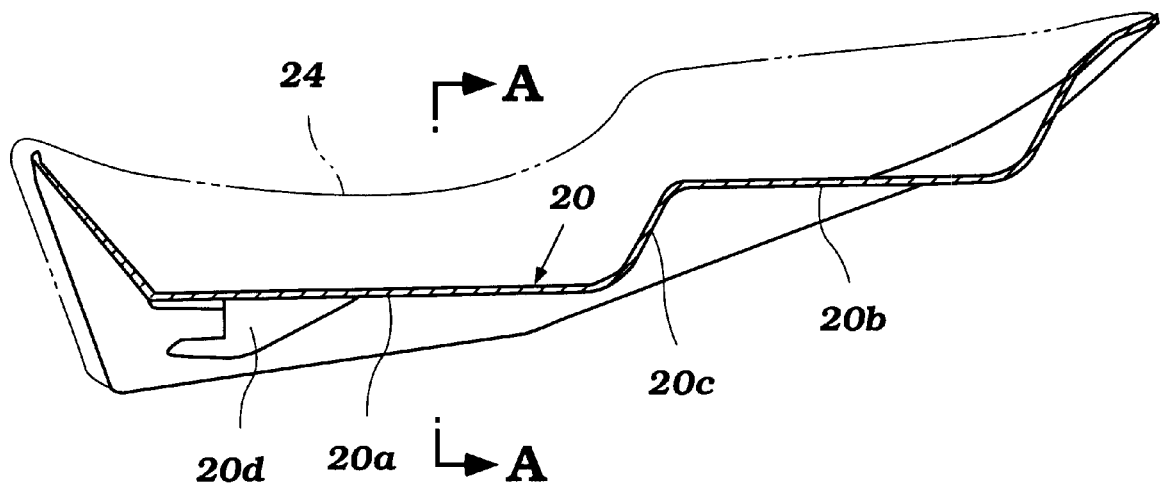
FIG. 2 is a longitudinal cross section of a bottom plate of a tandem seat as an embodiment of the present invention.

FIG. 2 is a longitudinal cross section of a bottom plate 20 constituting the bottom portion of seat 10. The bottom plate 20 comprises a planar member made of metal or hard plastic and is formed in an integral, stepped shape with bottom plates 20a and 20b. Bottom plate 20a is connected to bottom plate 20b through a step portion 20c. Bottom plates 20a and 20b correspond to front seat portion; and rear seating portion 10b, respectively. An engagement portion 20d is integrally formed on the underside of the front portion 20a of the bottom plate 20 for engagement with a seat securing portion (not shown) of a vehicle body.

Figure 3:
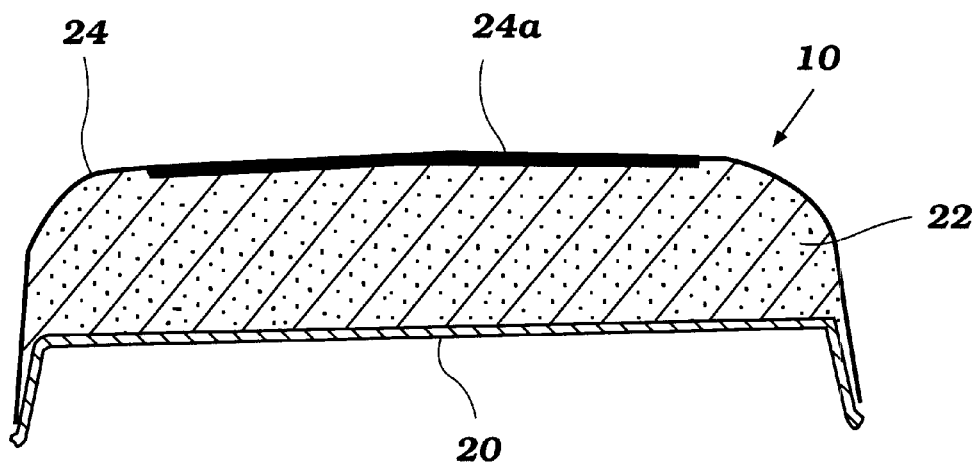
FIG. 3 is a lateral cross section of the seat taken along line A—A on FIG. 2.

FIG. 3 is a lateral cross section taken along line A—A of FIG. 2 of the seat 10. A cushion stuffing 22 is placed on the bottom plate 20 and is covered with a seat skin 24, with the periphery of the seat skin 24 secured to the periphery of the bottom plate 20. The cushion stuffing 22 is constructed of urethane foam. The seat skin 24 is constructed of a surface skin made of polyvinyl chloride synthetic leather, and a backing sheet made of wooly nylon.

Figure 4:
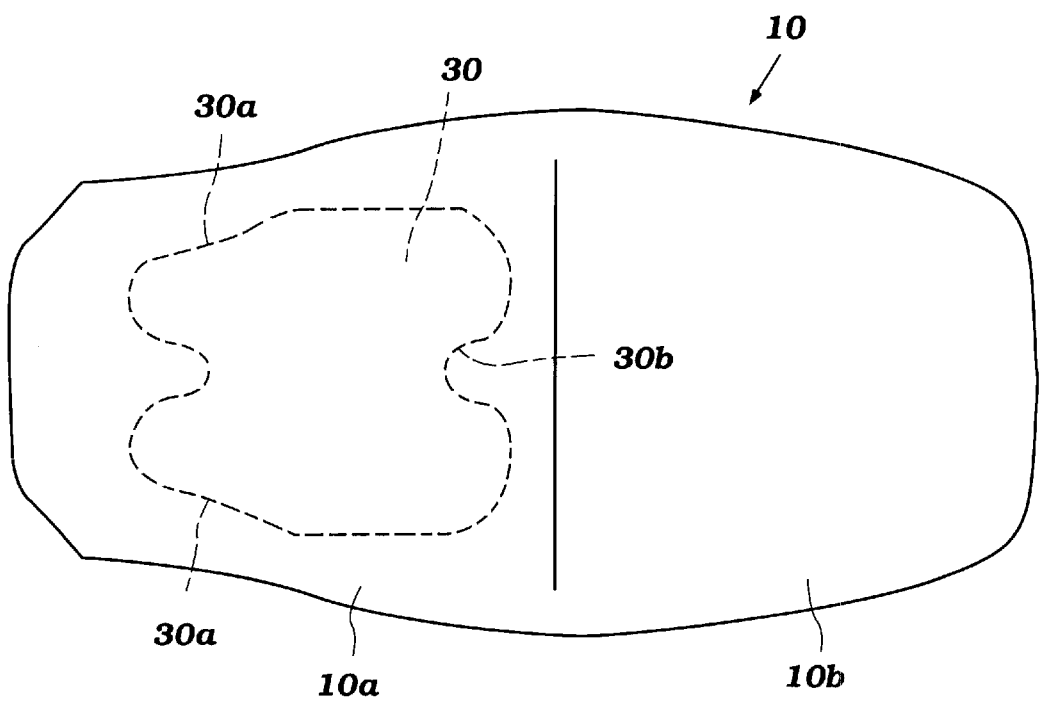
FIG. 4 is a plan view of the seat shown in FIG. 3 showing the greater firmness portion of the seat.

FIG. 4 is a plan view of the seat shown in FIG. 3 showing the greater firmness portion 30 of the seat 10. Greater firmness portion 30 has a greater firmness than other surrounding portions of seat 10. The design of the greater firmness portion 30 of the seat 10 corresponds to the areas where seat pressure produced by a rider is greatest, shown generally as 31 in the seating pressure distribution diagram in FIG. 6. The arrow shows the forward direction of the vehicle and rider when the rider sits on the seat 10.

The greater firmness portion 30 is located in the areas of greatest seat pressure 31 and repeated use. The inherent design of a straddle-type seat makes the seat conducive to permanent deformation in a repeatedly-used area. The greater firmness portion 30 is located in this area. By making the seat 10 more rigid in the areas of greatest seat pressure 31 and repeated use, improved riding comfort is provided and permanent deformation problems are prevented.

Figure 5:
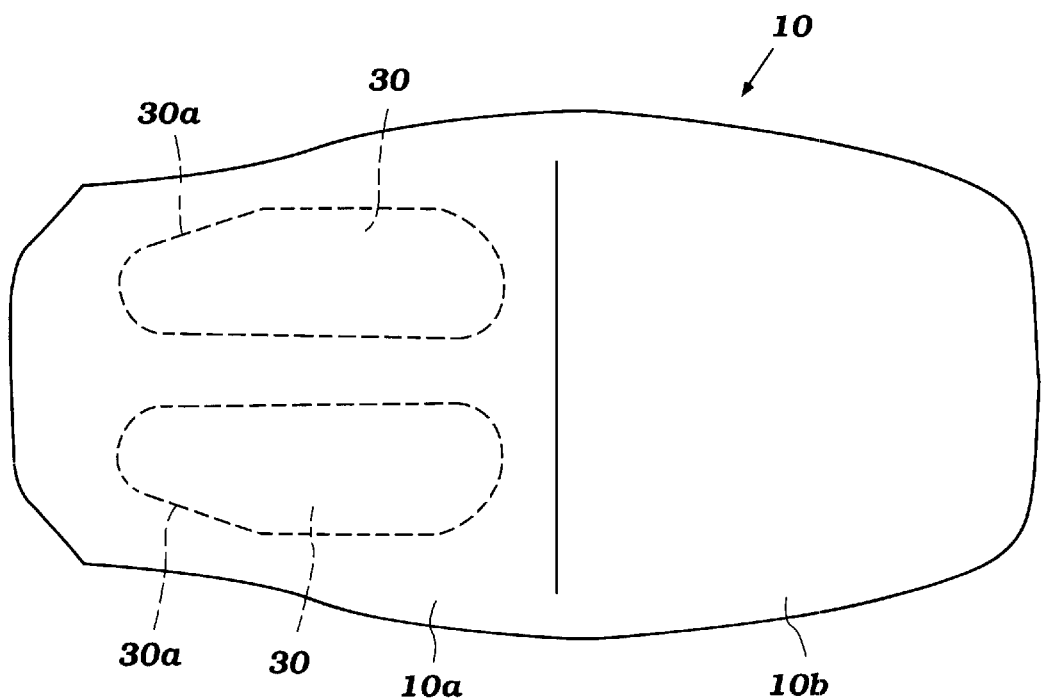
FIG. 5 is a plan view of an alternative design of the greater firmness portion of the seat.

FIG. 5 is a plan view of an alternative design of the greater firmness portion 30. In FIG. 5, the greater firmness portion 30 is not continuous, allowing for less firmness and greater comfort in a rider's genital region.

Figure 6:
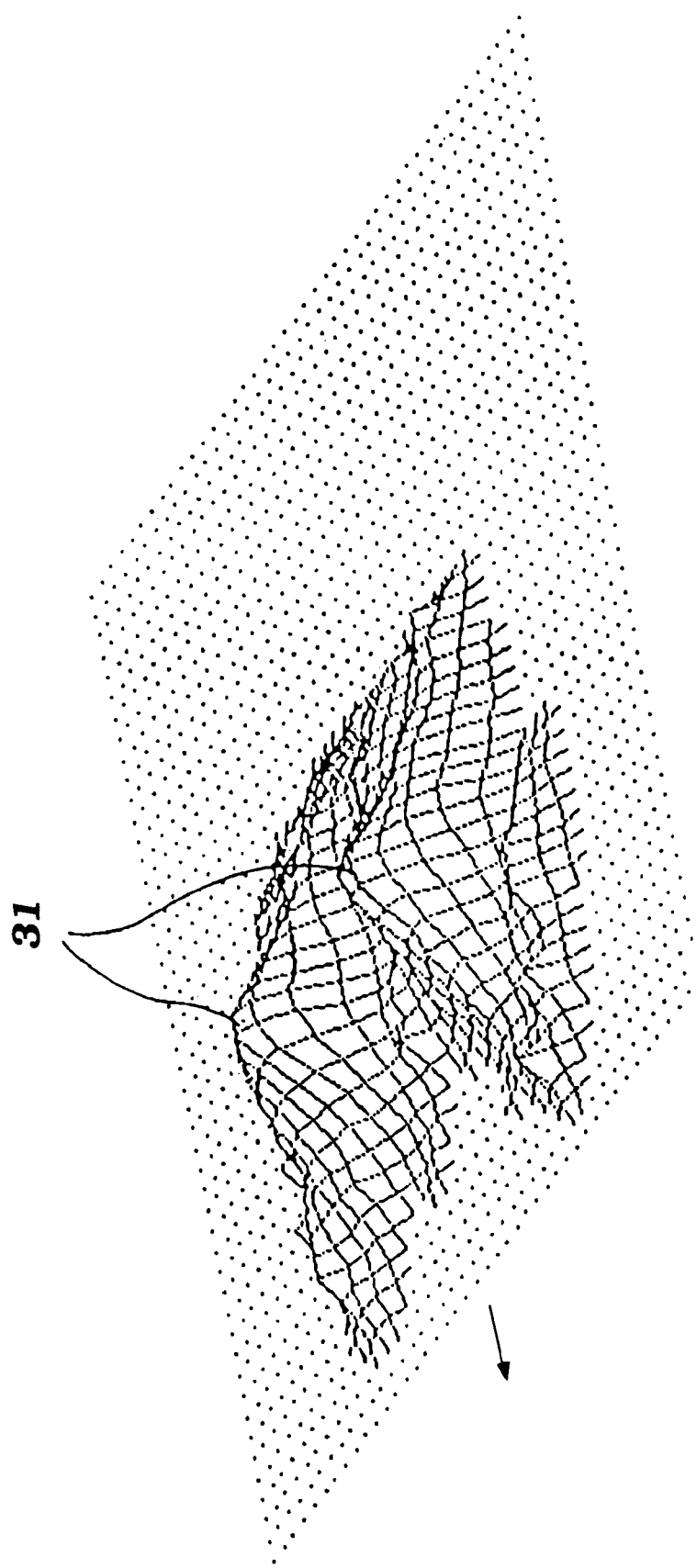
FIG. 6 is a three-dimensional diagram of pressure produced by a motorcycle rider.

As shown in FIGS. 4 and 5, the greater firmness portion 10 is more longitudinally elongated than the seating pressure distribution diagram in FIG. 6 in order to account for longitudinal shifts in riding position. Recesses 30A and 30B allow for less firmness and greater comfort in a rider's thighs and coccyx, respectively.

Numerous embodiments exist for creating the greater firmness portion 30 in seat 10. The greater firmness portion 30 may be created by varying the seat skin condition, cushion stuffing condition, or changing the interaction between the seat skin and cushion stuffing.

Figure 7:
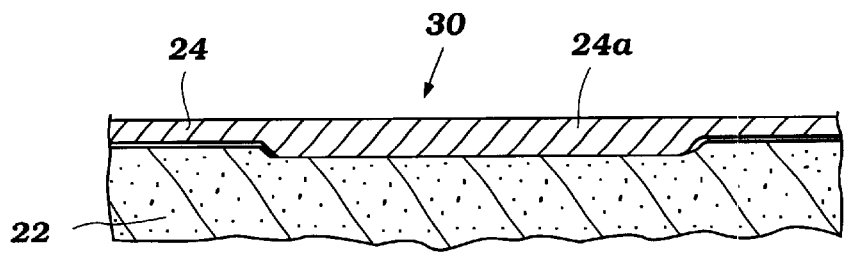
FIG. 7 is partially enlarged cross section of a the greater firmness portion of the embodiment shown in FIG. 3.
Figure 8:
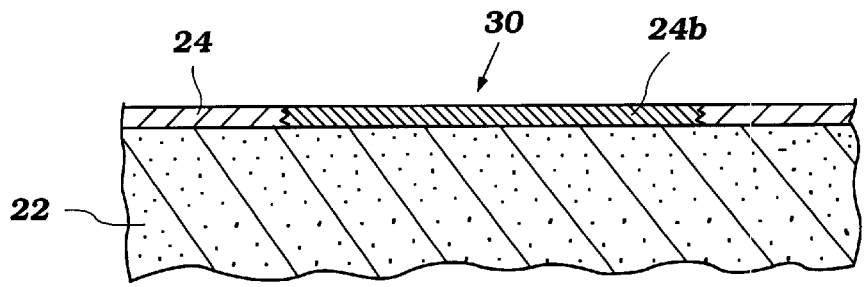
FIG. 8 is a partially enlarged cross section of a second embodiment of the greater firmness portion.

In FIGS. 7 and 8, the greater firmness portion is created by varying the seat skin condition. FIG. 7 is a partially enlarged cross section of the greater firmness portion of the embodiment shown in FIG. 3. In FIG. 7, a thicker seat skin 24a is provided in the greater firmness portion 30. Thicker seat skin 24a has a greater thickness than the seat skin 24 in the surrounding portions of seat 30. The thicker seat skin 24 makes the greater firmness portion 30 firmer and less elastic than surrounding portions of seat 30, providing greater riding comfort and preventing permanent seat deformation problems.

In FIG. 8, a different less elastic material 24b is provided in the greater firmness portion 30. The less elastic material 24b has a lower elasticity than the seat skin 34 in the surrounding portions of seat 10. The less elastic material 24b makes the greater firmness portion 30 firmer and less elastic than surrounding portions of seat 10. In an alternative embodiment, a different less elastic and thicker material 24b is provided in the greater firmness portion 30 to produce the same advantages mentioned above.

Alternatively, as also shown in FIG. 8, the greater firmness of portion 30 is created by varying the cushion stuffing condition. The great firmness portion 30 is created by increasing the density of the cushion stuffing 12 or using a less elastic cushion stuffing 22 in the greater firmness portion 30.

Figure 9:
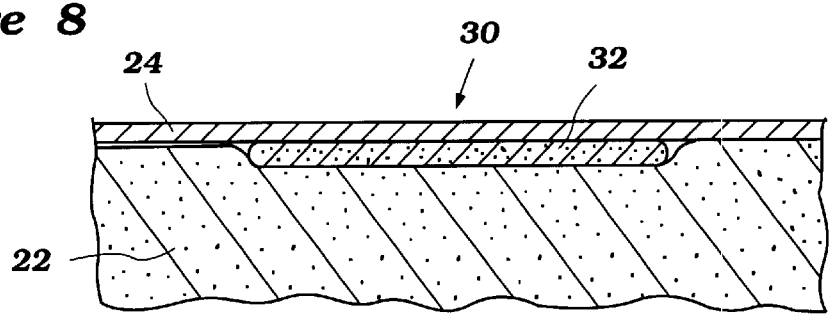
FIG. 9 is a partially enlarged cross section of a third embodiment of the greater firmness portion.
Figure 10:
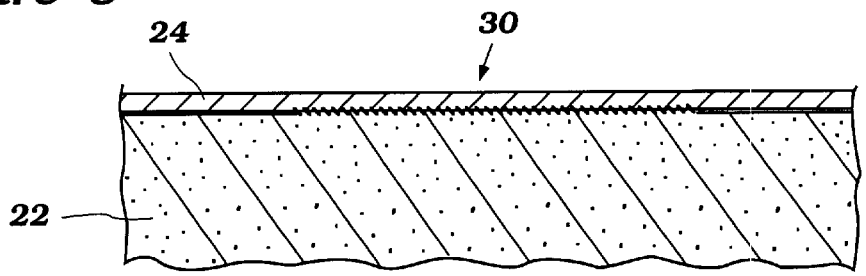
FIG. 10 is a partially enlarged cross section of a fourth embodiment of a greater firmness portion.
Figure 11:
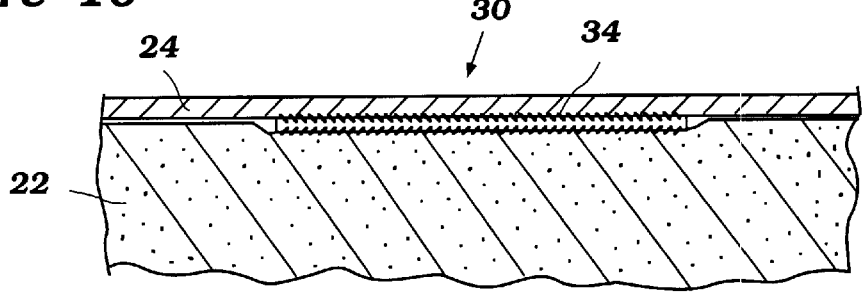
FIG. 11 is a partially enlarged cross section of a fifth embodiment of the greater firmness portion.

In FIGS. 9–11, the greater firmness portion 30 is created by changing the interaction between the seat skin 24 and the cushion stuffing 22. An impact absorbing member 32 in the shape of the greater firmness portion 10 is disposed between the seat skin 24 and cushion stuffing 22. Along with increasing firmness in the greater firmness region 30, the impact absorbing member 32 attenuates vibrations transmitted to the vehicle during operation. The impact absorbing member 32 is constructed of rubber or urethane. By bonding the impact absorbing member 32 to the underside of the seat skin 24 prior to the assembly of seat 10, manufacturing time of the seat decreases and productivity improves.

In FIG. 10, the greater firmness portion 30 is created by bonding the underside of the seat skin 24 directly to the cushion stuffing 22 with an organic solvent in the greater firmness portion 30.

In FIG. 11, the greater firmness portion is created by bonding the underside of the seat skin 24 to the cushion stuffing 22 with a double-sided adhesive sheet 34 in the shape of the greater firmness portion 30. Bonding the seat skin 24 to the cushion stuffing 22 with the double-sided adhesive sheet 15 instead of an organic solvent improves production efficiency because less time is spent applying the bond and no drying time is required. Bonding with a double-sided adhesive sheet 34 instead of an organic solvent also improves the workplace environment.

The variable firmness motorcycle seat is not limited to the specific embodiments described above and may be created by any combination of the above embodiments.

What is claimed is:

1. A straddle type vehicle seat comprising a bottom plate, a cushion stuffing placed on the bottom plate, a seat skin covering the cushion stuffing and secured to the bottom plate, a longitudinally elongated portion of greater firmness than surrounding portions incorporated into the seat so as to provide riding comfort and prevent permanent seat deformation problems for a longitudinally shifting rider, said portion of greater firmness having a shape corresponding to a longitudinally elongated version of the areas of the in the seat where seating pressure produced by the rider is the greatest.

2. The straddle-type vehicle seat of claim 1 wherein the firmness of the greater firmness portion is obtained by a means selected from the group consisting of varying the seat skin condition and varying the cushion stuffing condition and varying the interaction between the seat skin and cushion stuffing.

3. The straddle-type vehicle seat of claim 2, wherein the firmness of the greater firmness portion is obtained by varying the seat skin condition.

4. The straddle-type vehicle seat of claim 3, wherein the seat skin of the greater firmness portion is thicker than the seat skin of the surrounding portions.

5. The straddle-type vehicle seat of claim 3, wherein the seat skin of the greater firmness portion is less elastic than the seat skin of the surrounding portions.

6. The straddle-type vehicle seat of claim 3, wherein the seat skin of the greater firmness portion is thicker and less elastic than the seat skin of the surrounding portions.

7. The straddle-type vehicle seat of claim 2, wherein the firmness of the greater firmness portion is obtained by varying the cushion stuffing condition.

8. The straddle-type vehicle seat of claim 7, wherein the cushion stuffing of the greater firmness portion is more dense than the cushion stuffing of the surrounding portions.

9. The straddle-type vehicle seat of claim 2, wherein the firmness of the greater firmness portion is obtained by the interaction between the seat skin and cushion stuffing.

10. The straddle-type vehicle seat of claim 9, wherein the greater firmness portion includes an impact-absorbing member disposed between the seat skin and cushion stuffing.

11. The straddle-type vehicle seat of claim 9, wherein the seat skin is bonded to the cushion stuffing with an organic solvent in the greater firmness portion.

12. The straddle-type vehicle seat of claim 9, wherein the seat skin is bonded to the cushion stuffing with a double-sided adhesive sheet in the shape of the greater firmness portion.

13. A straddle-type vehicle seat comprising a bottom plate, a cushion stuffing placed on the bottom plate, a seat skin covering the cushion stuffing and secured to the bottom plate, means for providing a longitudinally elongated portion of greater firmness than surrounding portions incorporated into the seat so as to provide riding comfort and prevent permanent seat deformation problems for a longitudinally shifting rider, said greater firmness portion providing means having a shape corresponding to a longitudinally elongated version of the areas in the seat where seating pressure produced by the rider is the greatest.

14. The straddle-type vehicle seat of claim 13, wherein the firmness of the greater firmness portion is obtained by varying the seat skin condition.

15. The straddle-type vehicle seat of claim 14, wherein the seat skin of the greater firmness portion is thicker than the seat skin of the surrounding portions.

16. The straddle-type vehicle seat of claim 14, wherein the seat skin of the greater firmness portion is less elastic than the seat skin of the surrounding portions.

17. The straddle-type vehicle seat of claim 14, wherein the seat skin of the greater firmness portion is thicker and less elastic than the seat skin of the surrounding portions.

18. The straddle-type vehicle seat of claim 13, wherein the firmness of the greater firmness portion is obtained by varying the cushion stuffing condition.

19. The straddle-type vehicle seat of claim 18, wherein the cushion stuffing of the greater firmness portion is more dense than the cushion stuffing of the surrounding portions.

20. The straddle-type vehicle seat of claim 13, wherein the firmness of the greater firmness portion is obtained by the interaction between the seat skin and cushion stuffing.

21. The straddle-type vehicle seat of claim 20, wherein the greater firmness portion includes an impact-absorbing member disposed between the seat skin and cushion stuffing.

22. The straddle-type vehicle seat of claim 20, wherein the seat skin is bonded to the cushion stuffing with an organic solvent in the greater firmness portion.

23. The straddle-type vehicle seat of claim 20, wherein the seat skin is bonded to the cushion stuffing with a double-sided adhesive sheet in the shape of the greater firmness portion.

* * * * *